US008596325B2

(12) United States Patent
Bernhard et al.

(10) Patent No.: US 8,596,325 B2

(45) Date of Patent: Dec. 3, 2013

(54) LABELLING APPARATUS

(71) Applicant: Bizerba GmbH & Co. KG, Balingen (DE)

(72) Inventors: Juergen Bernhard, Empfingen (DE); Willi Sautter, Rosenfeld (DE); Sebastian Ruff, Grosselfingen (DE)

(73) Assignee: Bizerba GmbH & Co. KG, Balingen (DE)

(*) Notice: Subject to any disclaimer, the term of this patent is extended or adjusted under 35 U.S.C. 154(b) by 0 days.

(21) Appl. No.: 13/775,686

(22) Filed: Feb. 25, 2013

(65) Prior Publication Data

US 2013/0168024 A1 Jul. 4, 2013

Related U.S. Application Data

(63) Continuation of application No. PCT/EP2011/063596, filed on Aug. 8, 2011.

(30) Foreign Application Priority Data

Aug. 31, 2010 (DE) ......................... 10 2010 040 009

(51) Int. Cl.

*B29C 65/48* (2006.01)
*B32B 37/00* (2006.01)
*B65C 9/28* (2006.01)

(52) U.S. Cl.

USPC ..................... 156/497; 156/542; 156/DIG. 38

(58) Field of Classification Search

USPC ................... 156/384, 387, 497, 542, DIG. 38
See application file for complete search history.

(56) References Cited

U.S. PATENT DOCUMENTS

| | | | | | |
|---|---|---|---|---|---|
| 3,655,492 | A | * | 4/1972 | Burton | 156/541 |
| 3,888,725 | A | | 6/1975 | French | |
| 3,902,412 | A | * | 9/1975 | Pabodie | 101/93.07 |
| 3,906,609 | A | * | 9/1975 | Runge | 29/775 |
| 3,984,277 | A | | 10/1976 | French et al. | |
| 3,996,855 | A | * | 12/1976 | Pabodie | 101/291 |
| 4,025,385 | A | * | 5/1977 | Wood | 156/568 |
| 4,052,936 | A | * | 10/1977 | Pabodie | 101/93.07 |
| 4,302,277 | A | * | 11/1981 | Ilsemann | 156/567 |
| 4,556,443 | A | | 12/1985 | Moya | |
| 4,717,442 | A | * | 1/1988 | Hopson | 156/750 |

(Continued)

FOREIGN PATENT DOCUMENTS

| | | | |
|---|---|---|---|
| CA | 2 488 906 | A1 | 8/2005 |
| DE | 2 412 691 | | 9/1974 |

(Continued)

OTHER PUBLICATIONS

International Preliminary Report on Patentability, Application No. PCT/EP2011/063596, dated Mar. 14, 2013.

(Continued)

*Primary Examiner* — Sing P Chan

(74) *Attorney, Agent, or Firm* — Leydig, Voit & Mayer, Ltd.

(57) ABSTRACT

The invention relates to a labelling apparatus comprising a blow device which allows compressed-air controlled delivery of a label to an object to be labelled, wherein the blow device comprises a compressed-air providing device, a plurality of nozzles for applying compressed air to the label, a distribution space which is operatively connected for fluid communication with the compressed-air providing device and the nozzles, and at least one deflector which is arranged in the distribution space, wherein the distribution space has arranged therein a porous device which surrounds the at least one deflector.

29 Claims, 7 Drawing Sheets

(56) References Cited

U.S. PATENT DOCUMENTS

| | | | | |
|---|---|---|---|---|
| 4,914,893 | A * | 4/1990 | Strub et al. | 53/567 |
| 5,217,538 | A * | 6/1993 | Buchholz et al. | 134/25.4 |
| 5,658,647 | A * | 8/1997 | Magill et al. | 428/195.1 |
| 5,813,772 | A * | 9/1998 | Magill et al. | 400/120.01 |
| 6,024,149 | A | 2/2000 | Bernhard et al. | |
| 6,634,400 | B2 * | 10/2003 | Barbosa | 156/384 |
| 6,802,500 | B2 * | 10/2004 | Bennett et al. | 270/52.19 |
| 7,419,239 | B2 * | 9/2008 | Brown et al. | 347/25 |
| 7,600,850 | B2 * | 10/2009 | Blackburn et al. | 347/20 |
| 8,424,581 | B2 * | 4/2013 | Brandes | 156/541 |
| 8,460,499 | B2 * | 6/2013 | Stenner et al. | 156/235 |
| 2002/0185231 | A1 * | 12/2002 | Barbosa | 156/350 |
| 2003/0127195 | A1 * | 7/2003 | Barbosa | 156/384 |
| 2004/0104959 | A1 * | 6/2004 | Brown et al. | 347/22 |
| 2006/0197792 | A1 * | 9/2006 | Brown et al. | 347/11 |

FOREIGN PATENT DOCUMENTS

| | | | |
|---|---|---|---|
| EP | 0 883 549 | B1 | 4/2000 |
| FR | 2 715 145 | A1 | 7/1995 |
| JP | 52-88599 | U | 12/1950 |
| JP | 51-81696 | U | 6/1976 |
| JP | 51-24358 | B | 7/1976 |
| JP | 53-30640 | B | 8/1978 |
| JP | 59-106823 | U | 7/1984 |
| JP | 61-97105 | U | 6/1986 |
| JP | 2-1217 | Y2 | 1/1990 |
| JP | 3-60730 | B2 | 9/1991 |
| JP | 05270532 | A | 10/1993 |
| JP | 6-78209 | U | 11/1994 |
| JP | 10273123 | A | 10/1998 |
| JP | 11348952 | A | 12/1999 |
| JP | 2003-327223 | A | 11/2003 |
| JP | 2002-046723 | A | 2/2012 |

OTHER PUBLICATIONS

Search Report, Application PCT/EP2011/063596, mailed Feb. 27, 2002.

* cited by examiner

LABELLING APPARATUS

This application is a continuation of international application number PCT/EP2011/063596 filed on Aug. 8, 2011.

The present disclosure relates to the subject matter disclosed in international application number PCT/EP2011/063596 filed on Aug. 8, 2011 and German application No. 10 2010 040 009.2 of Aug. 31, 2010, which are incorporated herein by reference in their entirety and for all purposes.

BACKGROUND OF THE INVENTION

The invention relates to a labelling apparatus comprising a blow device which allows compressed-air controlled delivery of a label to an object to be labelled, wherein the blow device comprises a compressed-air providing device, a plurality of nozzles for applying compressed air to the label, a distribution space which is operatively connected for fluid communication with the compressed-air providing device and the nozzles, and at least one deflector which is arranged in the distribution space.

Labelling apparatuses are used to apply labels pre-printed with product information etc. to objects and in particular to the packages containing such objects. In particular, the labels, once printed, are drawn under vacuum suction and then automatically blown onto an object conveyed past them by a blast of compressed air.

EP 0 883 549 B1 discloses a labelling apparatus comprising a blow-on labelling apparatus wherein a slide element is arranged between a suction plate and a blow plate, said slide element being mounted for displacement in such a manner that in different adjustment positions thereof, it covers or opens variable surface areas of the suction plate and the blow plate for the passage of air sucked in or blown out therethrough.

JP 10273123 A discloses a suction body which stabilizes the spray capacity of air. To this end, a rectifying member is provided.

JP 2002046723 A and JP 2003327223 A each disclose labelling apparatuses.

DE 2 412 691 discloses a labelling device for applying a label to an object.

FR 2 715 145 A1 discloses an apparatus for transferring labels by use of pneumatic pulses.

U.S. Pat. No. 4,556,443 discloses a system for the high-speed application of labels to products.

U.S. Pat. No. 3,984,277 discloses a label applicator.

CA 2 488 906 A1 discloses an automated label applicator comprising an antenna to test RFID labels prior to their application.

JP 05270532 A discloses an automated labelling machine.

SUMMARY OF THE INVENTION

In accordance with an embodiment of the invention, a labelling apparatus is provided which allows defined, reproducible label application to be achieved.

In accordance with an embodiment of the invention, the labelling apparatus comprises a distribution space which has arranged therein a porous device which surrounds the at least one deflector.

The porous device acts as a throttle for the air flow. It generates a turbulent flow pattern. This causes the pressure to build up uniformly and simultaneously across all of the nozzles. By a blast of compressed air, a uniform pattern of compressed air can thereby be applied over the surface of a label in order to achieve a defined flight trajectory thereof.

Furthermore, the porous device allows a flow pattern to be provided that is not “gridded”. For example, in those instances in which a screen is used, a gridded pattern may be imposed on the air flow that results in a twist being imparted to the label when thrown.

It is advantageous for the porous device to be arranged between a lower wall having the nozzles arranged thereat and an upper wall and in particular for the porous device to be in touching contact with the lower wall and/or the upper wall. In this way, all of the nozzles inevitably only receive air that has passed through the porous device. This in turn causes a uniform and simultaneous application of pressure to the nozzles.

It is advantageous for the upper wall to have at least one opening formed therein via which compressed air from the compressed air-providing device is supplied to the at least one deflector. Compressed air and in particular pulses of compressed air can thereby be coupled into the distribution space. Label release can be effected in a timed manner.

It is advantageous for the at least one opening to widen on the side thereof facing towards the at least one deflector and in particular for a wall delimiting the opening to be provided with a chamfer. Defined air supply to the porous device can thereby be achieved.

It is particularly advantageous for the porous device to surround the at least one opening so that compressed air which is coupled in through the at least one opening is forced to flow through the porous device. This means that the compressed air that has been coupled into the distribution space must completely pass through the porous device before it reaches the nozzles.

In particular, the porous device has a height which corresponds to a height of the distribution space. It is thereby easily possible to prevent bypass flow of the compressed air past the porous device.

It is particularly advantageous for the porous device to comprise interconnected strands and in particular to be a (preferably irregular-patterned) mesh structure. It is thereby easily possible to achieve a throttle effect without imposing a “gridded” pattern on the flow.

It is then particularly advantageous for the porous device to be a knitted mesh structure in order to prevent adverse “gridding”.

It is further advantageous for the porous device to be made of metal or fibres, in particular carbon fibres. The porous device is for example a steel mesh. In this way, it is possible to prevent the porous device from being torn up as a result of its exposure to compressed air.

In an embodiment, provision is made for the at least one deflector to comprise at least one impact surface, with the position and in particular the height position of said impact surface in the distribution space being variably adjustable. This allows a user to adjust to current conditions.

By way of example, the at least one deflector is held by a thread. By adjusting the corresponding position on the thread, the height position of the impact surface can be adjusted.

In particular, a deflector is centrally arranged with respect to the nozzles. For example, this allows the manufacturing cost for the configuration of the flow pattern to the nozzles to be kept low.

In an embodiment, the nozzles are configured as Laval nozzles, i.e. as divergent nozzles. It is thereby possible to achieve a defined and uniform velocity distribution of the flow for releasing a label.

It is then particularly advantageous for the nozzle to have a length that is at least three times a narrowest cross-section of the nozzle. This results in a velocity distribution of the flow that is particularly specific and uniform.

Advantageously, provision is made for a vacuum-providing device and a suction element with openings, said suction element being operatively connected for fluid communication with the vacuum-providing device and being arranged forward of the distribution space, and a label can be suctioned onto the suction element. This provides a simple way of transferring a printed label from a printer unit to a blow unit and holding it onto the suction element by suction. By using pulses of compressed air from the blow device, said label can be released and applied to an object.

In particular, a space is formed between a lower wall of the distribution space and the suction element. Said space allows a vacuum to be applied to the suction element in order to achieve the suction effect.

In an embodiment, provision is made for the space to have a slide element arranged therein, said slide element being mounted for displacement such that in different adjustment positions thereof, it covers or opens variable surface areas of the nozzles and/or the openings in the suction element. By a corresponding adjustment position of the slide element, it is possible to adjust to the size of a label. The corresponding labelling apparatus can thereby be used with labels of different sizes.

Alternatively or additionally, it is possible for at least one mask to be positioned in the space, said mask covering or opening one or several nozzles and/or openings in the suction element and effecting an adjustment to the size of a label. A mask need not necessarily be displaceable; it can simply be inserted.

The invention further relates to a labelling apparatus, comprising a blow device which allows compressed-air controlled delivery of a label to an object to be labelled, a printer device by which a label can be printed and a deflection device by which a label coming from the printer device can be deflected for its positioning with respect to the blow device.

The deflection device causes a label coming from the printer device to be deflected for optimum positioning thereof with respect to the blow device.

It is an object of the invention to provide a labelling apparatus of the kind mentioned at the outset which allows defined label application to objects while having variable applicability.

In accordance with the invention, this object is achieved in the above-mentioned labelling apparatus in that the position of the deflection device relative to the printer device is fixed and in that the position of the blow device relative to the deflection device is fixably adjustable.

In the solution in accordance with the invention, the relative position of the deflection device with respect to the printer device is invariable. Adjustment capability is achieved by the blow device being adjustable in position relative to the deflection device. However, this does not adjust the deflection operation for deflecting labels coming from the printer device. The relative position between the deflection device and the printer device is always maintained. This allows sensitive adjustment with respect to label positioning for blow-on application thereof without interfering with the deflection from the printer device.

In an embodiment the deflection device is arranged on a holder and the blow device is fixably displaceable on the holder and/or relative to the holder. This results in a variable adjustment of the position of the blow device relative to the deflection device, with the position of the deflection device relative to the printer device being fixed.

By way of example, the deflection device is arranged at a housing or is fixedly arranged relative to the housing and the blow device is fixably displaceable in the housing. It is thereby possible for example to adjust the distance between the blow device and the deflection device for blow-on application of labels without changing the relative position of the deflection device relative to the printer device.

In particular, the blow device is fixably displaceable in a label transport direction relative to the deflection device. This results in sensitive adjustability of the blow-on application operation and optimized adjustability to the given conditions.

Alternatively or additionally, it is possible for the blow device to be fixably displaceable in a direction transverse to a label transport direction relative to the deflection device.

In particular, an actuating device for actuating a change of position of the blow device is provided. A user can thereby adjust from the exterior the relative positions for optimized adjustment.

The following description of preferred embodiments serves to explain the invention in greater detail in conjunction with the drawings.

DETAILED DESCRIPTION OF THE INVENTION

Figure 1:
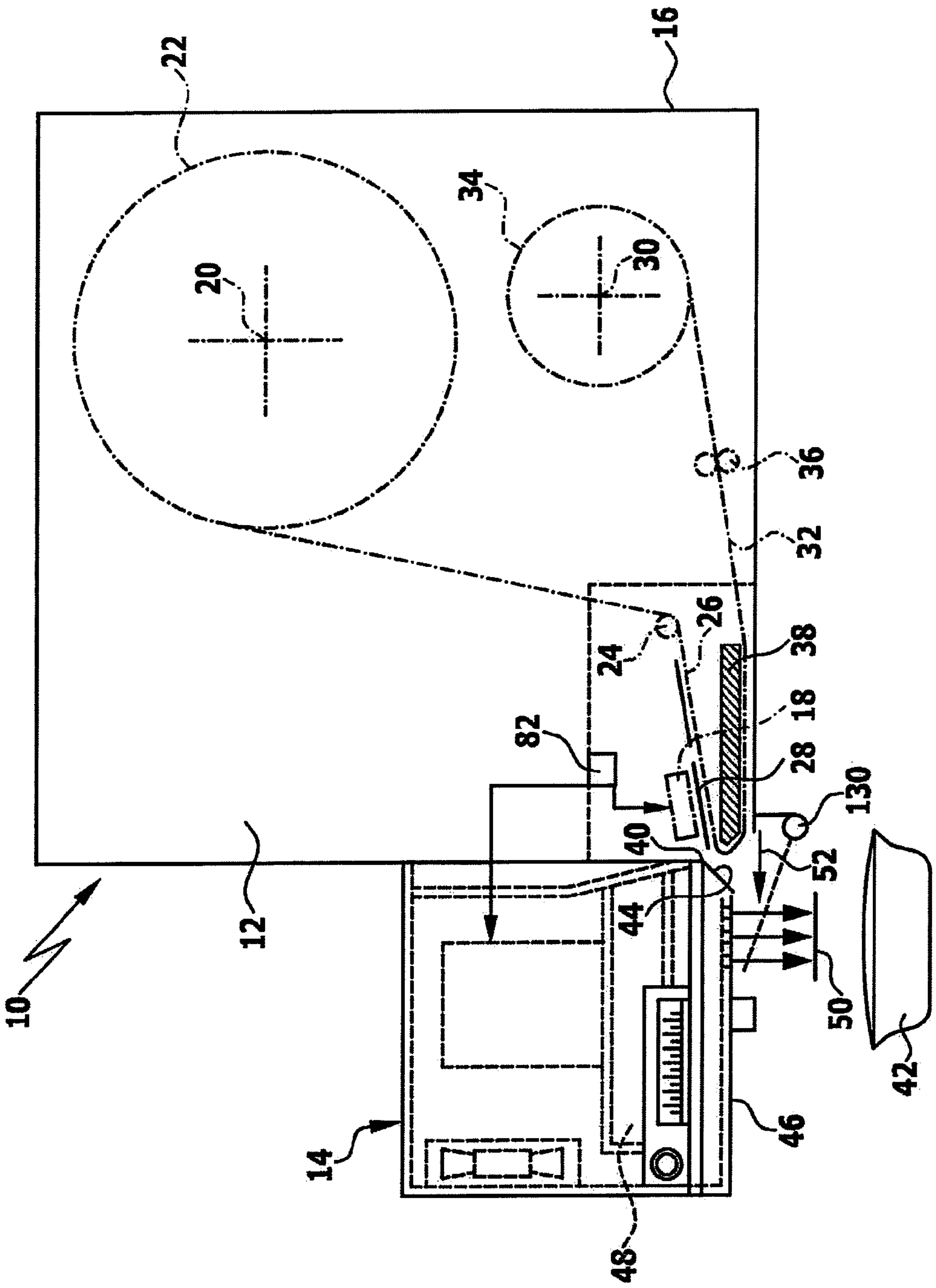
FIG. 1 is a schematic representation of an exemplary embodiment of a labelling apparatus, seen in side view.

An example of an embodiment of a labelling apparatus constructed in accordance with the invention, shown in FIG. 1 and indicated therein by 10, comprises a printer unit 12 and a blow unit 14 (blow head). The printer unit 12 has a housing 16. A printer device 18 is arranged in the housing 16. Furthermore, a holder 20 for a label roll 22 is arranged in the housing 16. Positioned between the printer device 18 and the holder 20 is (at least) one and preferably driven deflection roller 24 for a label web 26. The label web 26 is guided from the label roll 22 to the printer device 18.

In principle, labels 28 that are to be printed by the printer device 18 may be self-adhesive or non-self-adhesive. Adhesive labels in turn may be arranged on a liner or may be of the linerless type.

In an embodiment, a holder 30 for a liner 32 is arranged in the housing 16 and said liner 32 is wound onto the holder 30 to form a roll 34. A guiding device 36 is provided which has for example opposed rollers between which the liner 32 is passed to obtain a defined winding-up action to form the roll 34.

In case that the labels 28 are arranged on a liner 32, a peeling bar 38 is arranged below the printer device 18 which serves to detach labels 28 from the liner 32.

Arranged at the housing 16 is an output opening 40 where labels are made available, in particular labels that have been printed by the printer device 18. Correspondingly provided labels are transferred to the blow unit 14 for placement thereof on an object 42.

As will be explained in greater detail hereinbelow, labels provided by the printer unit 12 are deflected by a deflection device 44. The blow unit 14 comprises a suction element 46, and a deflected label is suctioned onto the suction element 46. Using a blow device 48 of the blow unit 14, a corresponding label 50 is then blown in a direction towards the object 42 and is applied thereto and is in particular adhesively bonded thereto where the label 50 is self-adhesive.

During the transit from the printer unit 12 to the blow unit 14, a corresponding label is transported in a transport direction 52.

An example of an embodiment of a blow unit 14 (FIG. 2) comprises a housing 54.

It is provided for the deflection device 44 to be fixed in position with respect to the printer unit 12. In particular, the position of the deflection device 44 relative to the printer device 18 of the printer unit 12 is invariably fixed. As a result, the deflection of a label provided by the printer unit 12 is always the same regardless of the position of the blow device.

The deflection device 44 is arranged on a holder 56. The deflection device 44 is formed by an end region 58 of the holder 56, said end region 58 having an inclined surface 60 which is inclined on the side thereof facing towards the printer unit 12. The inclined surface 60 forms a deflection surface of the deflection device 44. A label coming from the output opening 40 is deflected by the inclined surface 60 in such a manner that it reaches the catchment area of the suction element 46.

In an example of an embodiment, the holder 56 is part of or fixedly attached to the housing 54.

It is also possible for the holder 56 to be fixed to or be part of the housing 16 of the printer unit 12.

Figure 2:
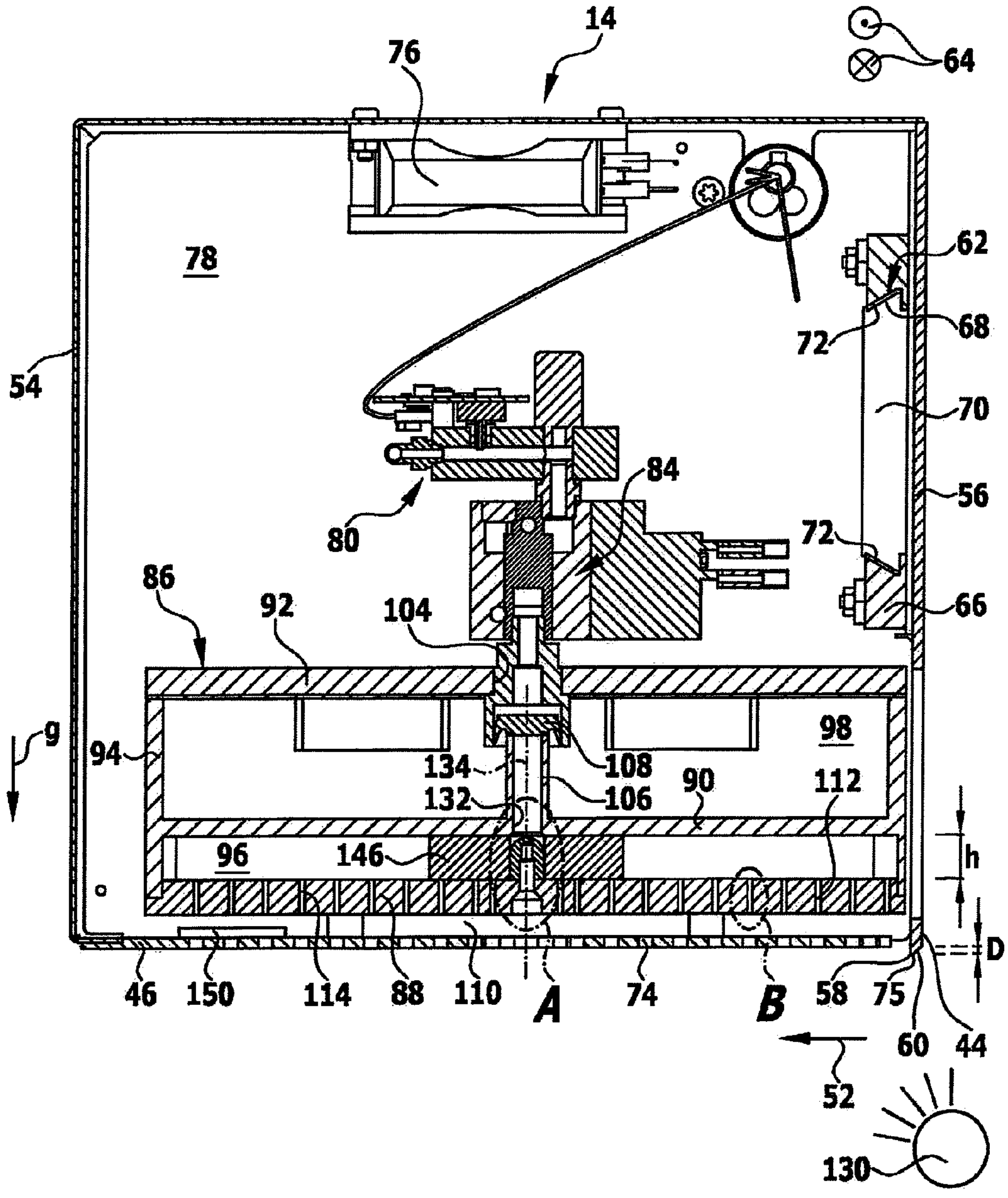
FIG. 2 is a sectional view of a blow unit of the labelling apparatus in accordance with FIG. 1 in a first example of an embodiment.

In an embodiment, the housing 54 is held for displacement on the holder 56 via a displacement guide 62. A displacement direction 64 is transverse and in particular perpendicular to the transport direction 52. The displacement direction 64 is perpendicular to the drawing plane as shown in FIG. 2.

The displacement guide 62 allows the blow unit 14 to be displaced in a displacement direction 64 relative to the printer unit 12. The displacement direction 64 is transverse and in particular perpendicular to the transport direction 52 of labels between the printer unit 12 and the blow unit 14. The displacement direction 64 is perpendicular to the drawing plane as shown in FIG. 2.

In an example of an embodiment, the displacement guide 62 is configured as a dovetail guide. To this end, for example, the housing 16 has arranged thereat a guide bar 66 which extends in the displacement direction 64. The guide bar 66 comprises a receiving space 68 for a guide element 70. Said guide element 70 and the receiving space 68 are adapted to each other so that the blow unit 14 is only displaceable in the displacement direction 64 but is fixed in transverse directions thereto. To this end, the receiving space 68 has inclined side walls 72, with the guide element 70 being of substantially trapezoidal configuration in cross-section.

It is also possible for the guide element 70 to be arranged at the housing 16 and for the guide bar 66 to be arranged at the holder 56.

The suction element 46 is arranged at a lower end of the housing 54 relative to the direction of gravity g and/or forms an underside of said housing 54. The suction element 46 is in particular configured as a suction plate.

The suction element 46 has a plurality of openings 74 therethrough.

A lower end 75 of the deflection device 44 (relative to the direction of gravity g) protrudes somewhat, by a distance D, beyond a lower plane of the suction element 46.

Arranged in the housing 54 of the blow unit 14 is a vacuum-providing device 76, in particular in the form of a fan. The vacuum-providing device 76 is operatively connected for fluid communication with the openings 74 of the suction element 46 via a corresponding housing cavity 78. A predetermined vacuum is generated in the housing cavity 78 when compared with the atmospheric pressure surrounding the housing 54. Labels can thereby be retained against the suction element 46.

The blow device 48 is arranged in the housing 54. It comprises a compressed air-providing device 80 by which a blast of air can be provided. The compressed air-providing device 80 comprises in particular a source of compressed air arranged within the housing 54. A control device 82 is provided (FIG. 1) via which a pulsed blast of air can be provided in a controlled and in particular in a timed manner. Said control device 82 also controls the printer device 18 and is for example arranged on the printer unit 12.

The compressed air-providing device 80 has an air flow path 84 associated with it, said air flow path being fluid-tightly separated from the housing cavity 78.

Figure 3:
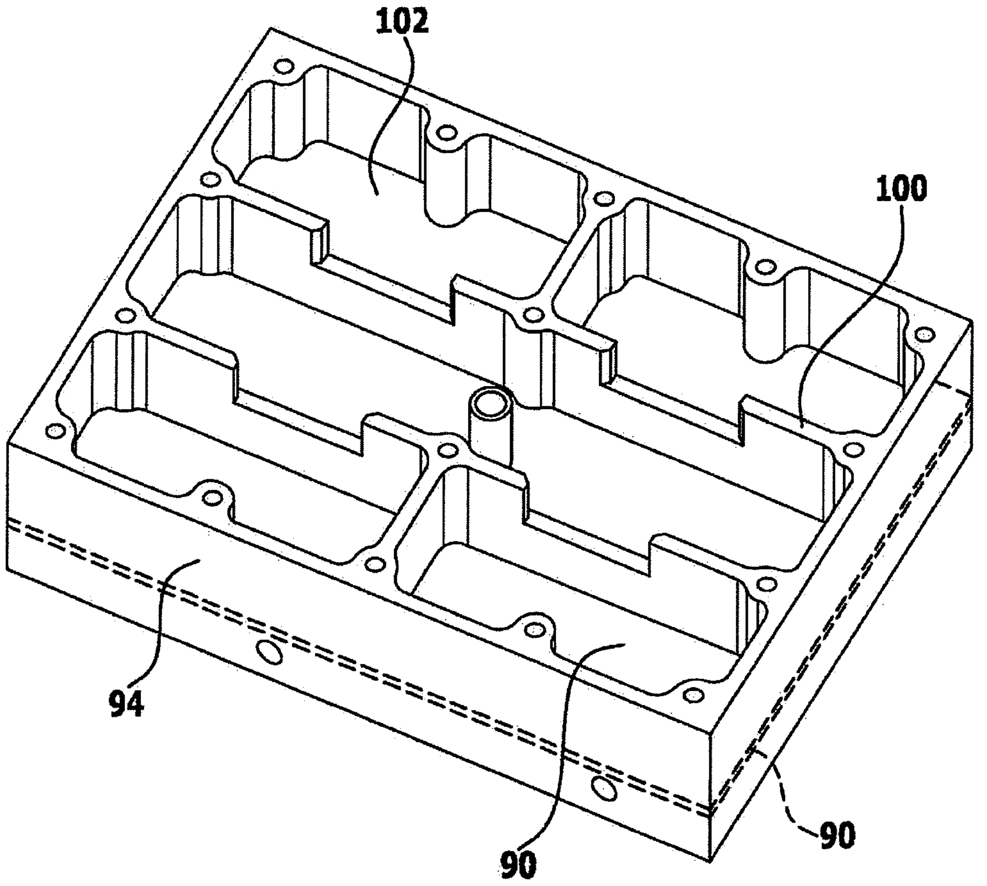
FIG. 3 is a perspective view of a portion of a housing of the blow unit in accordance with FIG. 2.

A storage chamber 86 is arranged in the housing 54. The storage chamber 86 comprises a lower wall 88, an upper wall 90 which is an intermediate wall, and an upper outer wall 92. The upper wall 90 is located between the lower wall 88 and the upper outer wall 92. Furthermore, the storage chamber 86 comprises a side wall 94. The side wall 94, the lower wall 88 and the upper wall 90 delimit a distribution space 96. The upper wall 90 and the upper outer wall 92 delimit a buffer space 98 which is arranged above the distribution space 96 relative to the direction of gravity g. The buffer space 98 is subdivided by corresponding interior walls 100 (FIG. 3) into a plurality of subspaces 102 operatively connected for fluid communication with one another (FIG. 3).

The storage chamber 86 has at the upper outer wall 92 thereof an opening 104 which is in particular centrally arranged and through which compressed air from the compressed air-providing device 80 can be coupled in.

Arranged at the upper wall 90 is a connection piece 106 which is for example configured as a cylinder tube and terminates below the opening 104. Arranged at the connection piece 106 is a valve 108 which may be in the form of a diaphragm valve for example. Said valve 108 allows control of the admission of a blast of air into the distribution space 96. If the valve 108 is open, compressed air from the compressed air-providing device 80 can be coupled into the distribution space 96. The buffer space 98 provides a buffer volume when the valve 108 is open. If the valve 108 is closed, the distribution space 96 is fluidly decoupled from the compressed air-providing device 80.

The distribution space 96 and the buffer space 98 are fluid-tightly closed against the housing cavity 78.

The lower wall 88 of the storage chamber 86 is spaced apart from the suction element 46. A space 110 is formed between the suction element 46 and the lower wall 88.

The lower wall 88 of the storage chamber 86 has openings 112 formed therethrough which allow the passage of a blast of air. The openings 112 correspond to the openings 74 in the suction element 46. In particular, the position of the openings 112 is in registration (alignment) with the position of the openings 74, with the openings 112 being smaller in opening cross-section than the openings 74.

Figure 7:
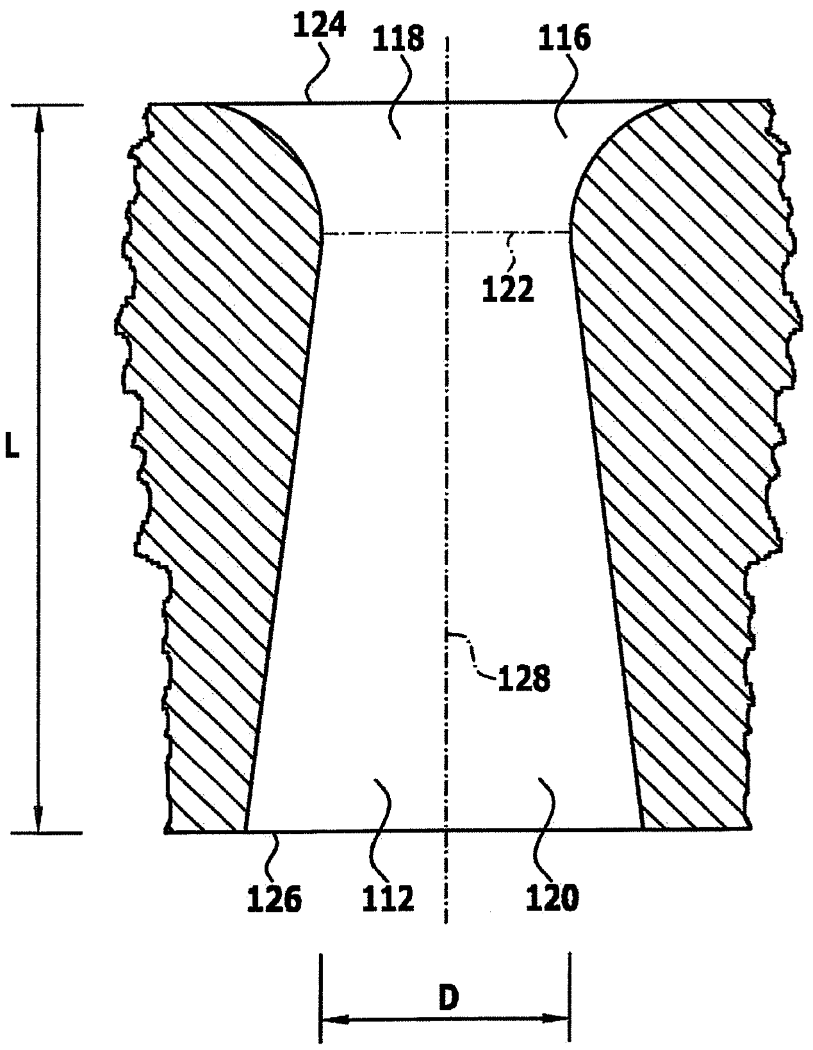
FIG. 7 is an enlarged view of area B in accordance with FIG. 2 (nozzle).

The openings 112 form nozzles 114. In an embodiment, the nozzles 114 are configured as Laval nozzles 116 (FIG. 7).

Such a Laval nozzle 116 has a first nozzle region 118 and a second nozzle region 120. The first nozzle region 118 and the second nozzle region 120 are delimited by a location 122 in the opening 112 which is the location of the narrowest opening cross-section. The first nozzle region 118 has an inlet mouth 124 to the distribution space 96. The second nozzle region 120 has an outlet mouth 126 to the space 110. The Laval nozzle 116 is rotationally symmetric about an axis 128, and the associated opening 74 is coaxial with said axis 128.

In the first nozzle region 118, the nozzle cross-section converges down to the location 122. In the second nozzle region 120, a nozzle space diverges conically towards the outlet mouth 126. A length L of the Laval nozzle 116 between the inlet mouth 124 and the outlet mouth 126 is (at least) three times the cross-section D at the narrowest location 122.

It is for example also possible for the nozzles 114 to be configured as cylindrical bores having a widening, and in particular a conical widening, in an outlet mouth region thereof. By way of example, said conical widening can be created by a kind of chamfer. Preferably, a length L of such a nozzle is at least three times the cross-section of the nozzle, with the cross-section of the nozzle being related to a region outside of the outlet mouth region.

The openings 74 are in particular hollow-cylindrical openings.

Optionally, a support air device 130 is arranged below the suction element 46 (relative to the direction of gravity g). Said support air device 130 preferably provides a pulsed blast of air in a direction towards the suction element 46. As a label is transferred from the printer unit 12 to the blow unit 14, the process of suctioning the label onto the suction element 46 can be assisted by said support air. The support air is in particular provided by the compressed air-providing device, which in that case is operatively connected for fluid communication with the support air device 130, which is arranged exterior to the housing 54.

An opening 132 is preferably centrally formed at the upper wall 90. Said opening 132 is preferably formed at the connection piece 106. The connection piece 106 has an internal space which is operatively connected for fluid communication with the opening 132. Air, and in particular a blast of air, can be coupled into the distribution space 96 through the opening 132. The opening 132 has an axis 134, and the opening 132 is preferably rotationally symmetric about said axis 134. Preferably, the opening 104 is coaxial with said axis 134.

Figure 4A:
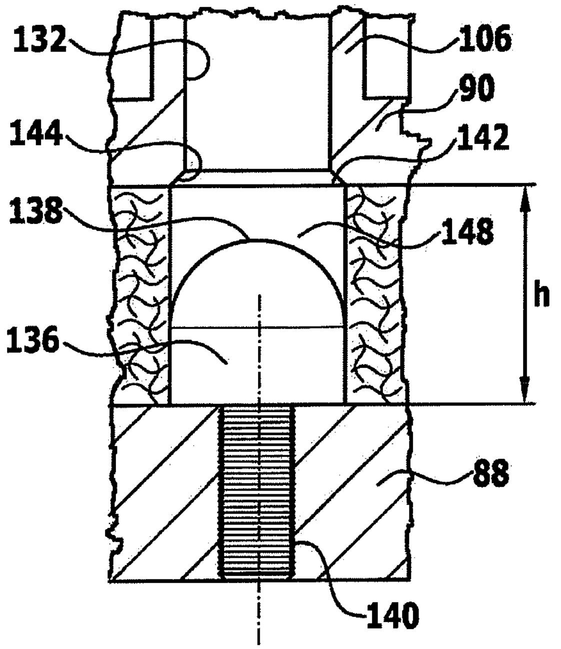
FIGS. 4(*a*), 4(*b*) are enlarged views of area A in accordance with FIG. 2, showing a deflector in different positions.
Figure 4B:
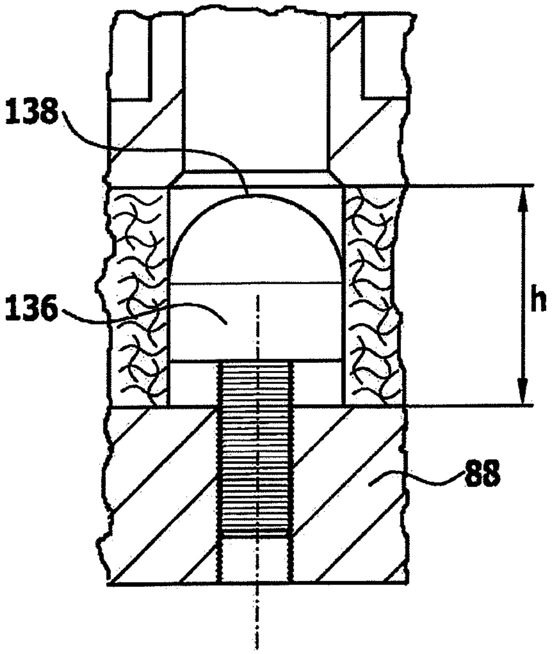

A deflector 136 is arranged in the distribution space 96 (FIGS. 2 and 4). Said deflector 136 is oriented coaxially with the axis 134 and has an impact surface 138 which is arranged below the opening 132. The impact surface 138 is curved. A blast of air that is blown in via the opening 132 and the connection piece 106 strikes against the impact surface 138 and is deflected laterally. This results in the air being distributed in the distribution space 96 and therefore in turn to the nozzles 114.

The deflector 136 is fixed in a central region of the lower wall 88. In an embodiment, the impact surface 138 is fixed by a thread 140 and a height position of the impact surface 138 in the distribution space 96, i.e. the distance thereof from the lower wall 88 or the upper wall 90, is adjustable.

In the area of the opening 132, a wall of the connection piece 106 meets the upper wall 90. In an embodiment, in the area of the opening 132 a widening 142 of the opening 132 is present in a direction towards the distribution space 96, i.e. an internal space of the connection piece 106 widens in cross-section in a direction towards a distribution space 96.

By way of example, the widening 142 is formed by a chamfer 144 of the upper wall 90 in the area of the opening 132.

The distribution space has a height h (FIGS. 2 and 4). The distance of a highest point of the impact surface 138 from the lower wall 88 is smaller than the height h.

The deflector 136 including its impact surface 138 is surrounded by a porous device 146. The porous device extends between the lower wall 88 and the upper wall 90; it has a height h. In particular, the porous device is in contact with the lower wall 88 and the upper wall 90. The porous device has an internal space 148 in which the deflector 136 is positioned. The internal space 148 has for example a hollow-cylindrical configuration. The porous device 146 is for example of annular configuration. Preferably, the internal space 148 has a cross-section which is identical to or greater than the cross-section of the opening 132 and is in particular greater than or identical to the widest cross-section of the opening 132.

A blast of air that is coupled in through the opening 132 is then deflected at the impact surface 138 of the deflector 136 and is forced to flow through the porous device.

The porous device comprises connected strands that are in particular connected by meshes. In particular, the porous device 146 is a mesh structure and is in particular a knitted meshwork. The porous device causes a turbulent flow pattern. This allows a uniform pressure to be built up across all of the openings 112 at the same time. No gridded pattern is thereby imposed on the flow which could lead to a twist being imparted to the label when thrown.

The porous device 146 is made of a metallic material and is in particular made of a steel mesh or knitted steel mesh or from a fibre material and in particular a carbon fibre material to prevent it from being torn up by exposure to the blast of air.

In an embodiment, one or more masks 150 are positioned or can be positioned in the space 110. Depending on the configuration of the mask, one or more nozzles 114 and one or more openings 74 are covered by a mask 150, while other nozzles 114 and openings 74 are opened. It is thereby possible to adjust to a specific label size, and the labelling apparatus constructed in accordance with the invention can be used with labels of different sizes, with reliable labelling of objects 42 being possible regardless of label size.

The labelling apparatus 10 constructed in accordance with the invention works as follows:

Labels are printed in the printer unit 12. The labels 28 are for example detached from a liner 32 in the printer unit 12.

Printed labels are delivered to the blow unit 14, with the deflection device 44 providing for optimized positioning during the delivery operation. Such optimized positioning can optionally be assisted by the support air device 130.

A vacuum is in particular continuously maintained at the suction element 46, said vacuum being generated by the vacuum-providing device 76. A delivered label is thereby sucked onto the suction element 46. A suctioned label is in a wait position; it is positioned in a defined manner in order to be applied to an object 42. As an object 42 is conveyed past the label, for example by a conveyor belt, the control device 82 triggers the provision of a blast of air in the distribution space 96 at the proper time; a pulsed blast of air is generated which causes the label to be released from the suction element 46 and to be delivered to and placed on the object 42.

The deflector 136 and the porous device 146 as a throttle provide for a uniform pressure buildup across all of the operable nozzles 114 at the same time. A defined flight trajectory of a label without a twist or the like is thereby effected. This in turn ensures reliable placement.

Figure 5:
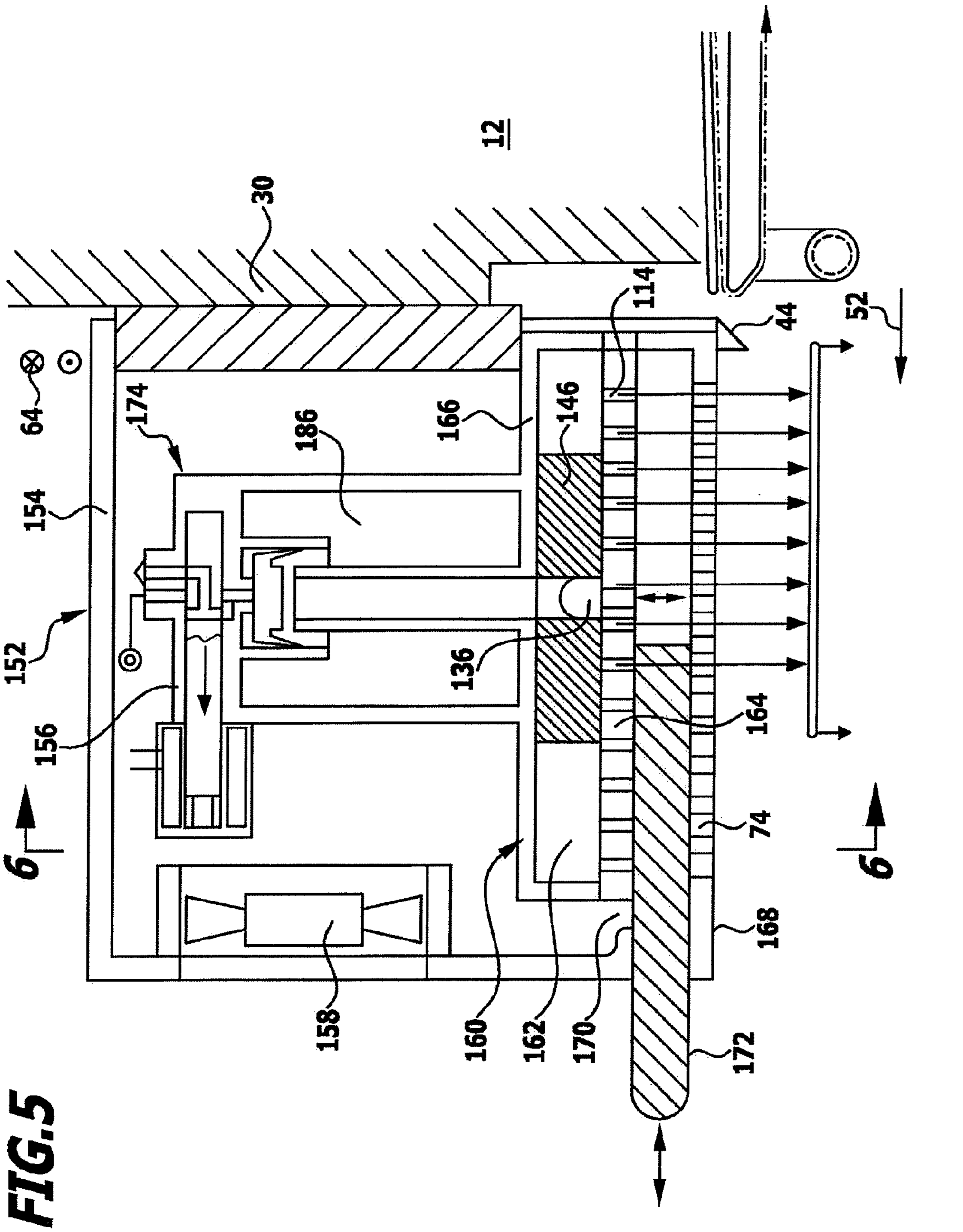
FIG. 5 is a sectional view of a further example of an embodiment of a blow unit constructed in accordance with the invention.

A further exemplary embodiment of a blow unit constructed in accordance with the invention, which is shown in FIG. 5 and indicated therein by 152, again has a housing 154 in which a compressed air-providing device 156 and a vacuum-providing device 158 are arranged. Furthermore, a storage chamber 160 is arranged in the housing 154, said storage chamber 160 being operatively connected for fluid communication with the compressed air-providing device 156. The storage chamber 160 has a distribution space 162 which is formed between a lower wall 164 and an upper wall 166. In this example of an embodiment, a buffer space corresponding to the buffer space 98 is provided.

The distribution space 162 in turn has a deflector 136 and a porous device 146 arranged therein (like reference numerals are used to identify the like elements previously described with reference to the blow unit 14).

A suction element 168 is seated at the housing 154, or the suction element 168 with openings corresponding to the openings 74 is part of said housing 154.

A space 170 is formed between the suction element 168 and the lower wall 164. A slide element 172 is guided for displacement in the space 170. By use of this slide element 172, variable surface areas of the nozzles 114 and of the openings 74 can be covered or opened. By positioning the slide element 172, it is possible to adjust to a specific label size.

Figure 6:
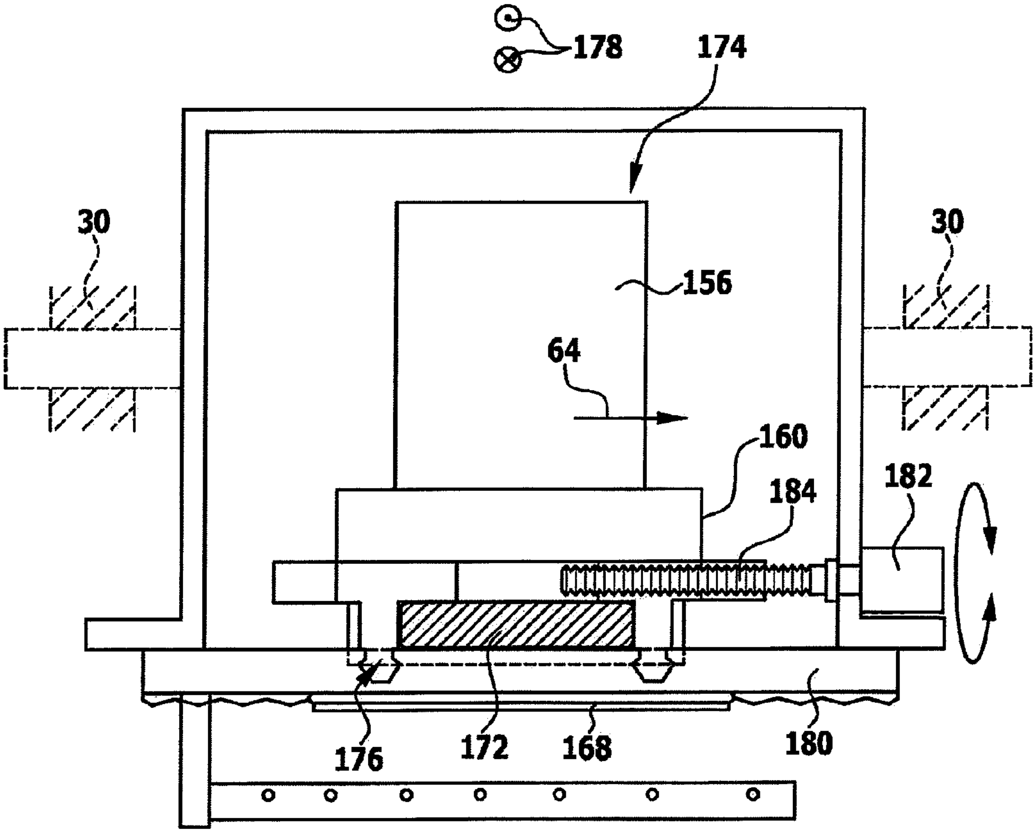
FIG. 6 is a sectional view along line 6-6 in accordance with FIG. 5.

Provision may be made for the storage chamber 160 and the compressed air-providing device 156 to form a "rigid" unit 174 which is movable as a whole in the housing 154 (FIG. 6). The housing 154 as a whole may be displaceable relative to the holder 30 in the displacement direction 64. The unit 174 is mounted in the housing 154 for displacement in a displacement direction 178 via a displacement guide 176. Said displacement direction 178 is transverse and in particular perpendicular to the displacement direction 64. Furthermore, the displacement direction 178 is at least approximately parallel to the transport direction 52 of labels between the printer unit 12 and the blow unit 152.

To this end, for example, the displacement guide 176 is formed at a bottom 180 of the housing and in particular external to the suction element 168, with the unit 174 being displaceably and fixably positionable in the manner of a slide on the displacement guide 176. An actuating device 182 is provided which allows a user to fixably adjust the position of the unit 174 in the displacement direction 178 from the exterior of the housing 154.

The actuating device 182 comprises for example a spindle assembly 184 which allows the position to be fixably adjusted in the displacement direction 178.

The position of a blow device 186 of the blow unit 152 which is implemented on the unit 174 can be variably adjusted with respect to the deflection device 44 via the displacement guide 176. By use of the actuating device 182, which is in particular a manual actuating device, the unit 174 is longitudinally displaceable at least approximately parallel to the transport direction 52.

Furthermore, transverse displaceability is achieved by the housing 154 being displaceable relative to the holder 30.

A corresponding adjustment does not cause adjustment of the position of the deflection device 44 relative to the printer unit 12.

LIST OF REFERENCE NUMBERS

10 labelling apparatus
12 printer unit
14 blow unit
16 housing
18 printer device
20 holder
22 label roll
24 deflection roller
26 label web
28 labels
30 holder
32 liner
34 roll
36 guiding device
38 peeling bar
40 output opening
42 object
44 deflection device
46 suction element
48 blow device
50 label
52 transport direction
54 housing
56 holder
58 end region
60 inclined surface
62 displacement guide
64 displacement direction
66 guide bar
68 receiving space
70 guide element
72 side wall
74 opening
75 lower end
76 vacuum-providing device
78 housing cavity
80 compressed air-providing device
82 control device
84 air flow path
86 storage chamber
88 lower wall
90 upper wall
92 upper outer wall
94 side wall
96 distribution space
98 buffer space
100 interior wall
102 subspace
104 opening
106 connection piece
108 valve
110 space
112 openings
114 nozzle
116 Laval nozzle
118 first nozzle region
120 second nozzle region
122 location
124 inlet mouth
126 outlet mouth
128 axis
130 support air device
132 opening
134 axis
136 deflector
138 impact surface
140 thread
142 widening
144 chamfer
146 porous device

148 internal space
150 mask
152 blow unit
154 housing
156 compressed air-providing device
158 vacuum-providing device
160 storage chamber
162 distribution space
164 lower wall
166 upper wall
168 suction element
170 space
172 slide element
174 unit
176 displacement guide
178 displacement direction
180 bottom
182 actuating device
184 spindle assembly
186 blow device

The invention claimed is:

1. A labelling apparatus, comprising:

a blow device which allows compressed-air controlled delivery of a label to an object to be labelled;

wherein the blow device comprises a compressed-air providing device;

a plurality of nozzles for applying compressed air to the label;

a distribution space which is operatively connected for fluid communication with the compressed-air providing device and the nozzles; and at least one deflector which is arranged in the distribution space;

wherein the distribution space has arranged therein a porous device which surrounds the at least one deflector.

2. The labelling apparatus in accordance with claim 1, wherein the porous device is arranged between a lower wall having the nozzles arranged thereat and an upper wall, wherein the lower wall and the upper wall delimit the distribution space.

3. The labelling apparatus in accordance with claim 2, wherein the upper wall has at least one opening formed therein via which compressed air from the compressed air-providing device is supplied to the at least one deflector.

4. The labelling apparatus of claim 2, wherein the porous device is in touching contact with at least one of the lower wall and the upper wall.

5. The labelling apparatus in accordance with claim 3, wherein the at least one opening widens on the side thereof facing towards the at least one deflector.

6. The labelling apparatus in accordance with claim 3, wherein the porous device surrounds the at least one opening so that compressed air which is coupled in through the at least one opening is forced to flow through the porous device.

7. The labelling apparatus of claim 5, wherein a wall delimiting the opening is provided with a chamfer.

8. The labelling apparatus in accordance with claim 1, wherein the porous device has a height which corresponds to a height of the distribution space.

9. The labelling apparatus in accordance with claim 1, wherein the porous device comprises interconnected strands.

10. The labelling apparatus of claim 9, wherein the porous device comprises a mesh structure.

11. The labelling apparatus in accordance with claim 1, wherein the porous device is a knitted mesh structure.

12. The labelling apparatus in accordance with claim 1, wherein the porous device is made of metal or fibers.

13. The labelling apparatus of claim 12, wherein the porous device comprises carbon fibers.

14. The labelling apparatus in accordance with claim 1, wherein the at least one deflector comprises at least one impact surface, with the position of said impact surface in the distribution space being variably adjustable.

15. The labelling apparatus in accordance with claim 14, wherein the at least one deflector is held by a thread.

16. The labelling apparatus of claim 14, wherein the height position of said impact surface in the distribution space is variably adjustable.

17. The labelling apparatus in accordance with claim 1, wherein a deflector is centrally arranged with respect to the nozzles.

18. The labelling apparatus in accordance with claim 1, wherein the nozzles are configured as Laval nozzles.

19. The labelling apparatus in accordance with claim 1, wherein a nozzle has a length that is at least three times a narrowest cross-section of the nozzle.

20. The labelling apparatus in accordance with claim 1, wherein a vacuum-providing device and a suction element with openings are provided, said suction element being operatively connected for fluid communication with the vacuum-providing device and being arranged forward of the distribution space, with a label being suctionable onto the suction element.

21. The labelling apparatus in accordance with claim 20, wherein a space is formed between a lower wall of the distribution space and the suction element.

22. The labelling apparatus in accordance with claim 21, wherein the space has a slide element arranged therein, said slide element being mounted for displacement such that in different adjustment positions thereof, it covers or opens variable surface areas of at least one of the nozzles and the openings in the suction element.

23. The labelling apparatus in accordance with claim 21, wherein the space has at least one mask positioned therein, said mask covering or opening at least one of (i) one or more nozzles and (ii) one or more openings in the suction element, and effecting an adjustment to the size of a label.

24. The labelling apparatus in accordance with claim 1, further comprising a printer device which allows a label to be printed and a deflection device which allows a label coming from the printer device to be deflected for its positioning with respect to the blow device, wherein the position of the deflection device relative to the printer device is fixed and the position of the blow device relative to the deflection device is fixably adjustable.

25. The labelling apparatus in accordance with claim 24, wherein the deflection device is arranged on a holder and the blow device is at least one of (i) fixably displaceable on the holder and (ii) fixably displaceable relative to the holder.

26. The labelling apparatus in accordance with claim 24, wherein the deflection device is arranged on a housing or is fixedly arranged relative to the housing and the blow device is fixably displaceable in the housing.

27. The labelling apparatus in accordance with claim 24, wherein the blow device is fixably displaceable in a label transport direction relative to the deflection device.

28. The labelling apparatus in accordance with claim 24, wherein the blow device is fixably displaceable in a direction transverse to a label transport direction relative to the deflection device.

29. The labelling apparatus in accordance with claim 24, wherein an actuating device is provided for actuating a change of position of the blow device.

* * * * *